United States Patent [19]

Marum

[11] 4,199,714
[45] Apr. 22, 1980

[54] VOLTAGE REGULATOR FOR INTEGRATED INJECTION LOGIC ELECTRONIC SYSTEM WITH LIQUID CRYSTAL DISPLAY

[75] Inventor: Steven E. Marum, Sherman, Tex.

[73] Assignee: Texas Instruments Incorporated, Dallas, Tex.

[21] Appl. No.: 908,343

[22] Filed: May 22, 1978

[51] Int. Cl.² .............................................. G05F 1/56
[52] U.S. Cl. ...................................... 323/4; 368/204; 368/242; 350/332
[58] Field of Search .......................... 58/23 A, 23 BA; 307/296 A, 297; 323/4, 19, 22 T

[56] References Cited

U.S. PATENT DOCUMENTS

| | | | |
|---|---|---|---|
| 3,965,666 | 6/1976 | Williams | 307/297 X |
| 3,999,368 | 12/1976 | Yoshida | 58/23 BA |
| 4,013,901 | 3/1977 | Williams | 307/296 A |
| 4,048,632 | 9/1977 | Spence | 307/296 A |
| 4,099,073 | 7/1978 | Hashimoto et al. | 58/23 BA |
| 4,112,670 | 9/1978 | Morozumi | 58/23 A |

Primary Examiner—A. D. Pellinen
Attorney, Agent, or Firm—Melvin Sharp; James T. Comfort; N. Rhys Merrett

[57] ABSTRACT

An electronic system, such as an electronic timepiece, utilizes multi-level, integrated injection logic circuitry and a liquid crystal display. A low-power voltage regulator is provided for driving the liquid crystal display which has a negative temperature coefficient. The voltage regulator provides a negative temperature coefficient which tracks the negative temperature coefficient of the liquid crystal display by utilizing the multi-levels of the integrated injection logic circuit to provide the electrical equivalent of a plurality of series-connected diodes without additional current drain.

16 Claims, 3 Drawing Figures

VOLTAGE REGULATOR FOR INTEGRATED INJECTION LOGIC ELECTRONIC SYSTEM WITH LIQUID CRYSTAL DISPLAY

BACKGROUND OF THE INVENTION

This invention relates to voltage regulators and, more particularly, to a low-power voltage regulator with negative temperature coefficient. Features of the system disclosed in the present application are also disclosed and claimed in copending application Ser. No. 908,336 filed May 22, 1978, by Steven E. Marum for Integrated Injection Logic Electronic System with Voltage Regulator for Multiplexed Liquid Crystal Display, which application is assigned to the assignee of the present application.

Present-day electronic systems having liquid crystal display, such as calculators, timepieces and the like, use a liquid crystal material which is sensitive to ultraviolet light, thereby necessitating the use of a yellow-colored ultraviolet filler over the display. These displays are used because the temperature coefficients of the threshold and saturation voltages are nearly zero which is very compatible over the operating temperature ranges with the battery voltage utilized in the system. Multiplexed liquid crystal displays, which do not require ultraviolet filtering, have considerable temperature coefficients at the threshold and saturation voltages and cannot be used unless the battery voltage is regulated to match them. Ordinary voltage regulators utilize a zener diode with positive temperature coefficient to provide for a resultant temperature coefficient of nearly zero. In order to provide a voltage regulator circuit with negative temperature coefficient, the circuit would be required to include a plurality of diodes having a negative temperature coefficient connected in series. However, the resulting circuit would draw a considerable amount of wasted current through the added diodes.

It is therefore an object of the present invention to provide a low-power voltage regulator for driving a negative temperature coefficient liquid crystal display.

It is another object of the present invention to provide a low-power voltage regulator which operates most efficiently in combination with integrated injection logic circuitry.

A further object of the invention is to provide an improved electronic integrated injection logic system with liquid crystal display.

It is yet another object of the invention to provide a low-power voltage regulator having a negative temperature coefficient.

Still a further object of the invention is to provide an electronic system, such as an electronic timepiece, with a liquid crystal display which does not require ultraviolet filtering.

BRIEF DESCRIPTION OF THE INVENTION

These and other objects are accomplished in accordance with the present invention by providing an electronic system with series connected multi-levels of integrated injection logic circuitry and a liquid crystal display which does not require the use of ultraviolet filtering. Such display has a negative temperature coefficient, and a low-power voltage regulator is provided for driving the liquid crystal display which has a correspondingly negative temperature coefficient. The voltage regulator is coupled to multi-levels of the integrated injection logic circuit to provide the electrical equivalent of a plurality of series-connected diodes. The circuit does not require any additional diodes for regulation of the voltage and, hence, does not require any more current drain than is already present in the multi-level integrated injection logic circuitry which also provides all of the logic functions of the system for display by the liquid crystal display. The result is an extremely low power consumption by the novel negative temperature coefficient voltage regulator circuit.

BRIEF DESCRIPTION OF THE DRAWINGS

Still further objects and advantages of the invention will be apparent from the detailed description and claims when read in conjunction with the accompanying drawings wherein:

DETAILED DESCRIPTION OF PREFERRED EMBODIMENTS OF THE INVENTION

Figure 1:
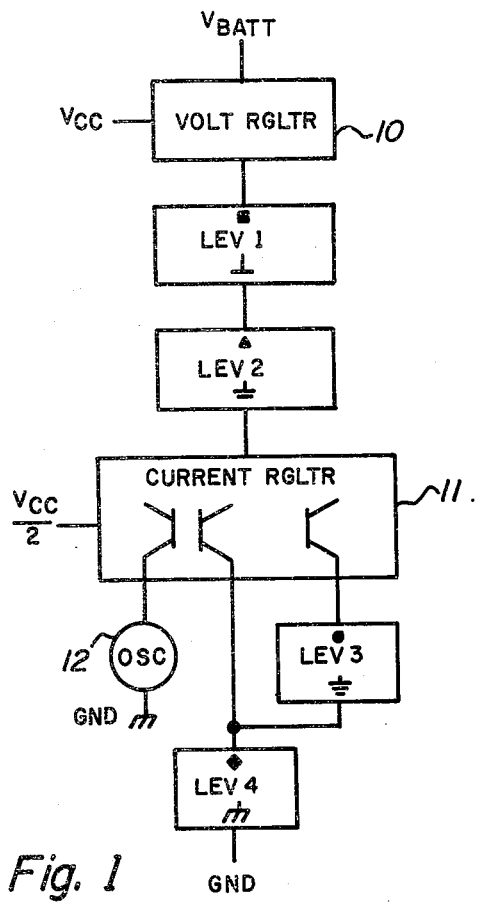
FIG. 1 is a block diagram of an electronic system in accordance with the present invention.

Referring now to the drawings, an electronic system, such as an electronic timepiece, utilizes series-connected, multi-level integrated injection logic circuitry for generating logic signals which are displayed by a liquid crystal display. The display is comprised of a liquid material which does not require ultraviolet filtering, but which, consequently, has a negative temperature coefficient. One such material is comprised of 0.4 cholesteric and is commercially manufactured and sold by Roch Incorporated and identified as ROTN 132 material. The use of a stacked multi-level logic design for integrated injection logic systems, such as electronic watches, is described and claimed in U.S. Pat. No. 4,013,901, issued March 22, 1977, to Clark R. Williams which patent is assigned to the assignee of the present invention and incorporated herein by reference. As described in said patent, a plurality of logic levels of integrated injection logic circuitry and a current regulator are connected in series between a battery power supply. The current regulator is also connected in series with an oscillator to regulate the oscillator current supply and thereby stabilize the oscillator frequency. This additional feature is described and claimed in U.S. Pat. No. 3,965,666, issued June 29, 1976, to Clark R. Williams, also assigned to the assignee of the present invention and incorporated herein by reference.

With reference to FIG. 1, two unique features are embodied in the present system when compared with the above-referenced circuit described in the earlier patents. Namely, current regulator 11 is herein positioned selectively between the logic levels thereby providing a regulated fractional voltage, namely $V_{CC}/2$, without requiring additional current-consuming circuitry, and a voltage regulator 10 has been added to the system in series with a plurality of the integrated injection logic levels to provide a regulated drive voltage for the multiplexed liquid crystal display with negative temperature coefficient, the logic levels acting as the electrical equivalent of regular diodes without additional power consumption.

Thus, in the present embodiment, four integrated injection logic levels (LEV 1-LEV 4) comprise an electronic logic system such as an electronic timepiece. Voltage regulator 10 is coupled to the battery voltage supply $V_{BATT}$ and provides the operating voltage $V_{CC}$ which is supplied to the first level LEV 1 of the logic circuit and the drive voltage to the LCD display as will later be described in detail. In addition, levels 1 and 2 appear to voltage regulator 10 as two series-connected diodes, and oscillator 12 appears to voltage regulator 10 as another two series-connected diodes to provide voltage regulation of the battery power supply with a negative temperature coefficient which matches the temperature coefficient of the display. More particularly, the above-referenced liquid crystal display has a negative temperature coefficient of $-10$ mv/°C. The regulated output voltage of regulator 10 is about 2.5 V with a temperature coefficient of about $-10$ mv/°C. which controls the display driver to approximately track the temperature coefficient of the liquid crystal display. The voltage may be raised to 3 volts and the temperature coefficient changed to $-12$ mv/°C. by adding an additional diode in series with I²L LEVEL 2 or (see FIG. 2) oscillator 12 and the emitter of Q104.

Voltage regulator 10 and the voltage splitting arrangement provided by current regulator 11 embodied in the present electronic system, will now be described in further detail with respect to FIG. 2.

Figure 2:
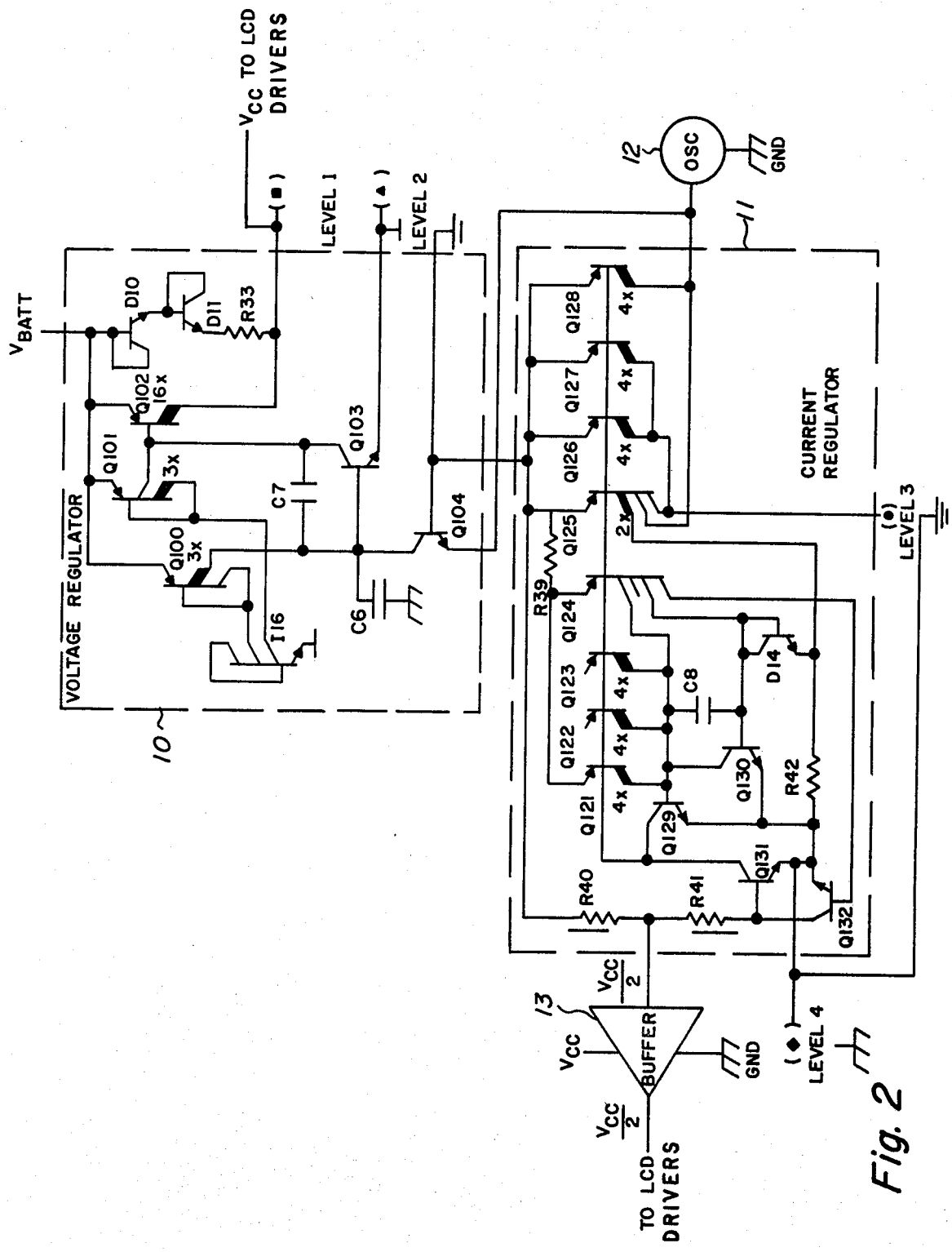
FIG. 2 is a circuit diagram of the voltage regulator and center-tapped current regulator which provide the required voltages for driving a negative temperature coefficient, multiplexed liquid crystal display.

Referring then to FIG. 2, voltage regulator 10 is comprised of a current sink provided by transistor I16, transistors Q100-Q104, start-up diodes D10 and D11, start-up resistor R33 and capacitors C6 and C7. Current regulator 11 is comprised of transistors Q121-Q132, diode D14, capacitor C8 and resistors R39-R42. It should be noted that the notations next to the transistor collectors of both regulators 10 and 11 (ie, 2x, 3x, 4x, etc) indicate the relative collector size. The emitters of transistors Q125-Q128 are the input and the collectors thereof are the outputs of current regulator 11; the emitter collector voltage ($V_{EC}$) of transistors Q125 and Q128, which is the same as the base emitter voltage ($V_{BE}$) of transistor Q104, is equal to the regulated voltage $V_{CC}$ applied to the anode of I²L LEVEL 1 minus the voltage drops across I²L LEVEL 1, I²L LEVEL 2 and oscillator 12. Transistor Q104 monitors this voltage ($V_{BE}$) and when its $V_{BE}$ exceeds about 0.5 volts, causes pass transistor Q102 to turn off. Transistor Q103 is the pre-driver transistor for transistor Q102. The emitter of transistor Q103 is coupled to the injector of I²L LEVEL 2 so that the pre-drive current is not wasted. Resistor R33 and diodes D10 and D11 provide start-up current into I²L LEVEL 1. Once LEVEL 1 starts up, current sink I16 causes transistors Q101 and Q100, as previously discussed, to turn on, and voltage regulator 10 begins running. Since, as previously discussed, I²L LEVEL 1 and I²L LEVEL 2 of the system are each the electrical equivalent of a diode with negative temperature coefficient, oscillator 12 of the system is the electrical equivalent of a plurality of two series-connected diodes with negative temperature coefficient and the base emitter junction of transistor Q104 is the equivalent of a diode with negative temperature coefficient, the voltage output $V_{CC}$ from the collector of pass transistor Q102 is regulated by transistor Q103 according to the resultant negative temperature coefficient of the five equivalent diodes.

As previously discussed, in order to drive the multiplexed LCD display, utilized in conjunction with the system of the present invention, two voltages are required: $V_{CC}$ and $V_{CC}/2$. $V_{CC}$ is provided directly from the collector of transistor Q102 of voltage regulator 10 as previously described. A regulated voltage equal to $V_{CC}/2$ is generated in accordance with a novel feature of the present system without increased power consumption. This is accomplished by stacking two of the I²L logic levels (LEVEL 1 and LEVEL 2) above current regulator 11 and two levels (LEVEL 3 and LEVEL 4) below it. A startup pinch resistor comprised of resistors R40 and R41 is required to get current regulator 11 started when power is initially applied. Once regulator 11 starts, the startup resistor (R40 and R41) is shorted to a collector of regulator output transistor Q125 by transistor Q132 when saturated. Thus, by adding a center-tap to the startup resistor (ie, by providing two resistors R40 and R41, a voltage equal to $V_{CC}/2$ is obtained at the center-tap, without adding additional circuit elements which would increase power consumption. The $V_{CC}/2$ output voltage is buffered by means of buffer 13.

Figure 3:
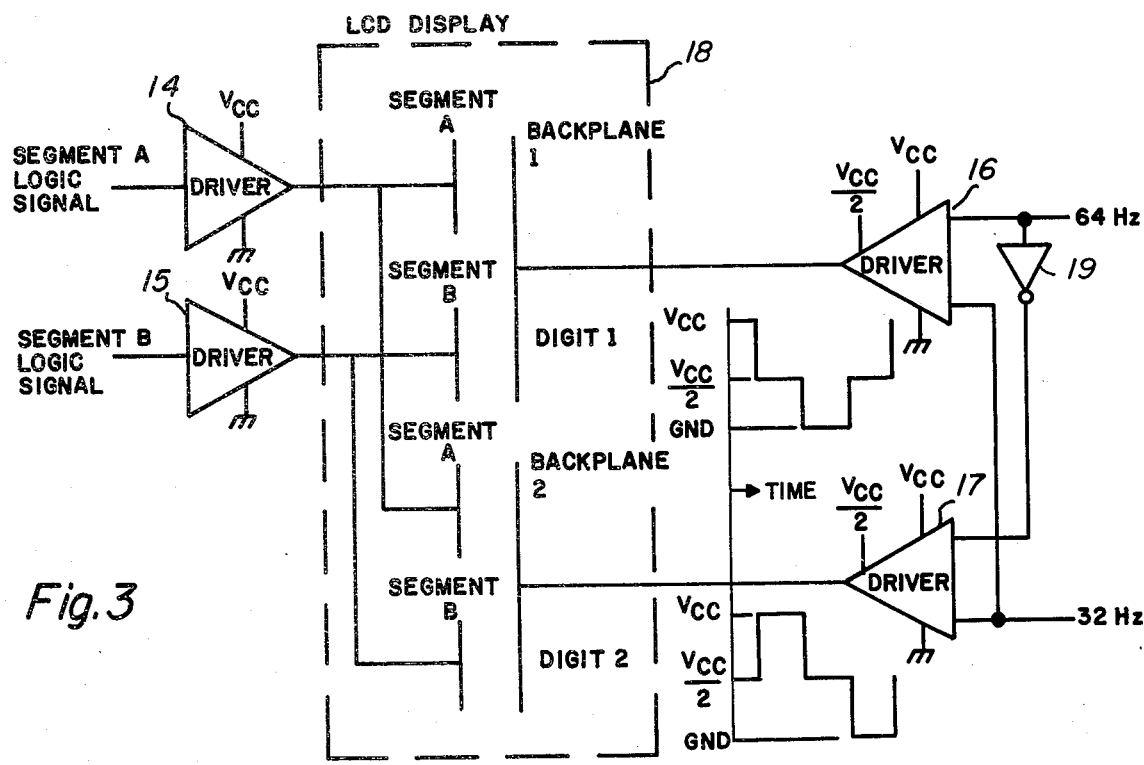
FIG. 3 is a circuit diagram of the multiplexed liquid crystal display.

Referring to FIG. 3, multiplexed LCD display 18, utilized in accordance with an embodiment of the system of the present invention, is illustrated. Display 18 includes a plurality of digits, each representing one or more alpha-numeric characters. Segment logic signals, A, B, etc, (eg, each character may have seven segments with each digit comprised of two characters) are simultaneously applied to a respective segment, SEGMENT A, SEGMENT B, etc, of each digit of the display by means of a respective segment driver, 14, 15, etc. A separate backplane (ie, BACKPLANE 1, BACKPLANE 2, etc) is provided for each respective digit (DIGIT 1, DIGIT 2, etc). The backplanes of the illustrated two-digit embodiment are driven by digit drivers 16 and 17, respectively. The backplanes are driven by means of a 32-HZ clock and a 64-HZ enable signal which alternately enables digit drivers 16 and 17 by means of NOT gate 19. The resulting backplane drive signals which are applied to BACKPLANE 1 and BACKPLANE 2, are graphically illustrated as a function of time in FIG. 3. The backplane drive signals alternate between $V_{CC}$ and ground, alternately driving BACKPLANE 1 and BACKPLANE 2, thereby generating a visual display according to the selected segments forming the characters of DIGIT 1 and DIGIT 2.

Various embodiments of the present invention have now been described in detail. Since it is obvious that many additional changes and modifications can be made in the above-described details without departing from the nature and spirit of the invention, it is understood that the invention is not to be limited to said details except as set forth in the appended claims.

What is claimed is:

1. An I²L system comprised of:
   (a) a plurality of hierarchal levels of I²L circuitry connected in series; and
   (b) a voltage regulator coupled in said series with said plurality of levels if I²L circuitry, said voltage regulator being responsive to the voltage drop across said levels of I²L circuitry for producing a regulated voltage with negative temperature coefficient.

2. The system according to claim 1 including means for coupling said voltage regulator and series-connected levels of I²L circuitry between a battery voltage supply, said voltage regulator for regulating the voltage produced by said battery voltage supply.

3. The system according to claim 1 including an oscillator circuit connected in said series with said plurality of levels of I²L circuitry and said voltage regulator, said oscillator circuit being coupled to at least one of said levels of I²L circuitry for generating clocking signals therefor, said voltage regulator for producing said regulated voltage with a negative temperature coefficient responsive to the voltage drops across said plurality of levels of I²L circuitry and said oscillator circuitry.

4. The system according to claim 1 including a current regulator circuit connected to receive output current from said series connected I²L circuitry for producing an approximately constant current for driving further levels of I²L circuitry, said current regulator being connected in series with said voltage regulator and the first mentioned plurality of levels of I²L circuitry.

5. An I²L system comprised of:
(a) a liquid crystal display containing a liquid crystal material having a negative temperature coefficient;
(b) an I²L semiconductor integrated circuit system coupled to said liquid crystal display for generating display signals to be displayed by said liquid crystal display;
(c) a plurality of display drivers coupling said I²L circuitry to said liquid crystal display for driving said liquid crystal display in accordance with said display signals; and
(d) a voltage regulator coupled to said display drivers for producing a regulated display driver voltage, said I²L system being comprised of a plurality of hierarchal levels of I²L circuitry connected in series and said voltage regulator being coupled in said series with said plurality of levels of I²L circuitry, said voltage regulator being responsive to the voltage drops across said levels of I²L circuitry for producing said regulated voltage with negative temperature coefficient. approximating the negative temperature coefficient of said liquid crystal display material.

6. The system according to claim 5 including means for coupling said voltage regulator and series-connected levels of I²L circuitry between a battery voltage supply, said voltage regulator for regulating the voltage produced by said battery voltage supply.

7. The system according to claim 5 including oscillator circuitry connected in series with said plurality of levels of I²L circuitry and said voltage regulator, said oscillator circuit being coupled to at least one of said levels of I²L circuitry for generating clocking signals therefor, said voltage regulator for producing said regulated voltage with a negative temperature coefficient responsive to the voltage drops across said plurality of levels of I²L circuitry and said oscillator circuitry.

8. The system according to claim 5 including a current regulator circuit connected to receive output current from said series connected I²L circuitry for producing an approximately constant current for driving further levels of I²L circuitry, said current regulator being connected in series with said voltage regulator and said first mentioned plurality of levels I²L circuitry.

9. The system according to claim 5 wherein said system is a digital electronic timepiece wherein said logic signals are timekeeping signals to be displayed by said liquid crystal display.

10. An I²L system comprised of:
a plurality of hierarchal levels of I²L circuitry connected to define a series current flow path;
voltage regulator means for connection to a voltage source and including means for providing operating current through said series current flow path thereby generating a voltage across said series current flow path which provides a regulated voltage for driving a display, said voltage regulator means including means for monitoring a voltage at a node in said series current flowpath which is subject to change with temperature, said monitoring means coupled to said means for providing said operating current to regulate said display drive voltage in accordance with a negative temperature coefficient in response to changes in said monitored voltage.

11. They system according to claim 10, wherein said monitoring means includes a transistor having an input terminal connected to said node in ther series current flowpath and means coupling an output terminal of said transistor to said means for providing said operating current.

12. An I²L system comprised of:
first and second hierarchal levels of I²L circuitry connected with current regulator means to define a series current flowpath current flow through said series current flowpath giving rise to essentially equal voltage drops across each of said hierarchal levels of I²L circuitry, said current regulator means connected to receive output current from said first level I²L circuitry and supplying regulated input current to said second level I²L circuitry, said current regulator means further connected to supply current to further circuit means to produce a voltage drop across said further circuit means equivalent to a predetermined multiple of said voltage drop across a hierarchal level of said I²L circuitry;
voltage regulator means connecting said first level I²L circuitry to a terminal for connection to a voltage source for providing operating current through said series current flowpath thereby generating a voltage across said series current flowpath which provides a regulated voltage for driving a display, said voltage regulator means including a controllable current source, and monitoring means for monitoring changes in voltage between the output of said first level I²L circuitry and the input of said further circuit means resulting from changes in temperature said monitoring means responsive to changes in said temperature dependent voltage to control the output of said current source thereby to regulate said display drive voltage in accordance with a negative temperature coefficient.

13. The system according to claim 12, wherein said monitoring means includes a bipolar transistor having a base-emitter junction connected between the output of said first level I²L circuitry and the input to said further circuit means, and means operably coupling the collector of said transistor to said controllable current source.

14. The system according to claim 13, wherein said coupling means comprises a further transistor having a base-collector path operably coupling the collector of said monitoring transistor to said controllable current source.

15. The system according to claim 12 or claim 13 or claim 14, wherein the further circuit means comprises an oscillator circuit.

16. The system according to claim 12, including a liquid crystal display containing a liquid crystal material having a negative temperature coefficient, drive circuit means coupled to said liquid crystal display and connected to receive said display drive voltage, the negative temperature coefficient of said regulated drive voltage substantially matching that of said liquid crystal display.

* * * * *